United States Patent [19]

Perner et al.

[11] Patent Number: 5,015,672

[45] Date of Patent: May 14, 1991

[54] SYNTHETIC RESIN WITH BASIC NITROGEN GROUPS, PREPARATION AND USE THEREOF USING A URETHANE CARRYING KETIMINE

[75] Inventors: Thomas Perner, Ludwigshafen; Rolf Osterloh, Erftstadt; Eberhard Schupp, Gruenstadt; Thomas Schwerzel, Ludwigshafen; Klaas Ahlers, Muenster, all of Fed. Rep. of Germany

[73] Assignee: BASF Lacke & Farben Aktiengesellschaft, Muenster, Fed. Rep. of Germany

[21] Appl. No.: 528,377

[22] Filed: May 25, 1990

Related U.S. Application Data

[62] Division of Ser. No. 210,499, Jun. 23, 1988, Pat. No. 4,956,402.

[30] Foreign Application Priority Data

Jun. 25, 1987 [DE] Fed. Rep. of Germany ....... 3720956

[51] Int. Cl.[5] .................... C08G 59/40; C09D 5/44
[52] U.S. Cl. .................................. 523/415; 523/414; 523/417; 523/420; 525/504; 528/45; 528/73; 528/111; 528/119; 528/120; 528/361; 528/369; 204/181.7
[58] Field of Search ............... 523/415, 414, 417, 420; 525/504; 528/45, 73, 111, 119, 120, 361, 369

[56] References Cited

U.S. PATENT DOCUMENTS

| | | | |
|---|---|---|---|
| 3,947,339 | 3/1976 | Jerabek et al. | 204/181.7 |
| 4,017,438 | 4/1977 | Jerabek et al. | 523/420 |
| 4,139,510 | 2/1979 | Anderson | 525/531 |
| 4,148,772 | 4/1979 | Marchetti et al. | 523/415 |
| 4,252,703 | 2/1981 | Patzchke et al. | 523/404 |
| 4,557,814 | 12/1985 | Schupp et al. | 204/181.7 |
| 4,596,842 | 1/1986 | Chung et al. | 523/414 |
| 4,956,402 | 9/1990 | Perner et al. | 523/415 |

FOREIGN PATENT DOCUMENTS 184152 6/1986 European Pat. Off.
198783 4/1988 European Pat. Off.

*Primary Examiner*—Earl Nielsen
*Assistant Examiner*—Frederick Krass
*Attorney, Agent, or Firm*—Keil & Weinkauf

[57] ABSTRACT

A synthetic resin which carries basic nitrogen groups and is water-dilutable by protonation with acid is obtainable by reacting (A) an epoxy resin having an average molecular weight $M_n$ of from 300 to 6,000 and on average from 1.5 to 3.0 epoxy groups per molecule with (B) a ketimine of a primary amine additionally containing one or more urethane groups and optionally also with (C) a diketimine of a diprimary amine containing no urethane groups and optionally also with (D) a secondary amine which may contain a tertiary amino group also, a ketimine of a primary monoamine and/or a ketimine of a primary/tertiary diamine.

20 Claims, No Drawings

SYNTHETIC RESIN WITH BASIC NITROGEN GROUPS, PREPARATION AND USE THEREOF USING A URETHANE CARRYING KETIMINE

This is a division of application Ser. No. 210,499, filed Jun. 23, 1988 now U.S. Pat. No. 4,956,402.

The present invention relates to synthetic resins which carry basic nitrogen groups and are water-dilutable by protonation with acid, and to the preparation and use thereof as a coating agent, in particular for cathodic electrocoating.

Synthetic resins which carry basic nitrogen groups are known. German Laid-Open Application DOS No. 3,325,061 describes a resin of this type, which is obtainable by reacting (A) at least one epoxy resin having an average molecular weight $M_n$ of from 300 to 6,000 and on average from 1.5 to 3.0 epoxy groups per molecule with (B) a diketimine of a diprimary amine and optionally also with (C) a secondary amine which may contain a tertiary amino group also, a ketimine of a primary monoamine and/or a ketimine of a primary/tertiary diamine.

Coatings of this type, however, do not show good corrosion protection in the salt spray mist test of German Standard Specification DIN No. 53,167.

It is an object of the present invention to provide a synthetic resin which carries basic nitrogen groups and is water-dilutable by protonation with acid and which, on protonation and dilution with water, gives more stable dispersion and, if used as a binder for cathodically depositable electrocoatings, highly resilient films of good corrosion protection.

We have found, surprisingly, that this object is achieved where synthetic resins carrying basic nitrogen groups additionally contain urethane groups Synthetic resins produced from an amine containing one or more urethane groups show appreciably better dispersibility, even if the amount of acid (for example acetic acid) used is smaller, than binders without urethane groups, as for example those of German Laid-Open Application DOS No. 3,325,061. This behavior has a beneficial effect on dispersion stability and corrosion protection behavior.

The present invention accordingly provides a synthetic resin which carries basic nitrogen groups and is water-dilutable by protonation with an acid, obtainable by reacting (A) an epoxy resin having an average molecular weight $M_n$ of from 300 to 6,000 and on average from 1.5 to 3.0 epoxy groups per molecule with (B) a ketimine of a primary amine additionally containing one or more urethane groups and optionally also with (C) a diketimine of a diprimary amine containing no urethane groups and optionally also with (D) a secondary amine which may contain a tertiary amino group also, a ketimine of a primary monoamine and/or a ketimine of a primary/tertiary diamine.

The present invention also provides a synthetic resin which carries basic nitrogen groups, which is water-dilutable by protonation with acid and the hydroxyl groups of which have additionally been at least partly converted with partially blocked polyisocyanate into urethane groups.

The present invention also provides the use of the novel synthetic resin which is water-dilutable by protonation with acid in the form of an aqueous dispersion which may additionally contain crosslinking agents, organic solvents, pigments and/or further auxiliary substances, as a coating agent, in particular for the cathodic electrocoating of electroconductive substrates.

The present invention also provides a coating agent which contains as the binder the synthetic resin with basic nitrogen groups prepared according to the invention and additionally a crosslinking agent.

Similarly, the present invention provides a coated article obtained by application of the novel synthetic resin or coating agent and baking.

In what follows, the components of the synthetic resin according to the invention and the preparation thereof will be discussed individually:

Epoxy resin (A) can be any desired material as long as it has an average molecular weight $M_n$ of from 300 to 6,000 and an average of from 1.5 to 3.0 epoxy groups per molecule, preferably two epoxy groups per molecule. Preference is given to epoxy resins having average molecular weights $M_n$ of from 350 to 5,000, in particular of from 350 to 2,000. Particularly preferred epoxy resins are for example glycidyl ethers of polyphenols containing on average at least two phenolic hydroxyl groups per molecule, which are preparable in a conventional manner by etherification with an epihalohydrin in the presence of alkali.

Examples of suitable phenol compounds are bis(4-hydroxytert-butylphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)2,2-propane, bis(2-hydroxynaphthyl)methane and 1,5-dihydroxynaphthalene. In some cases it is desirable to use aromatic epoxy resins having a higher molecular weight. These epoxy resins are obtained by reacting the above-mentioned diglycidyl ethers with a polyphenol, for example bis(4-hydroxyphenyl)-2,2-propane, and then further reacting the resulting compounds with epichlorohydrin to prepare polyglycidyl ethers.

Another suitable class of epoxy resins comprises polyglycidyl ethers of phenolic novolak resins.

Also suitable are polyglycidyl ethers of polyhydric alcohols, such as ethylene glycol, diethylene glycol, triethylene glycol, 1,2-propylene glycol, 1,3-propanediol, 1,5-pentanediol, 1,2,6-hexanetriol, glycerol and bis(4-hydroxycyclohexyl)-2,2-propane.

It is also possible to use polyglycidyl esters of polycarboxylic acids.

Of the polyphenol polyglycidyl ethers preferred according to the invention, particular preference is given to those having epoxy equivalent weights within the range from 180 to 1,000.

Aromatic polyepoxides having a higher epoxy equivalent weight can be prepared from those having a lower epoxy equivalent weight and polyphenols before or during the reaction with components (B), (C) and (D).

Ketimines of primary amines (B) additionally containing one or more urethane groups comprise reaction products of ketiminized alkanolamines and mono- or diisocyanates which may additionally be reacted with mono- or dialcohols.

To prepare ketiminized alkanolamines, it is possible to use alkanolamines having no fewer than 2 carbon atoms, such as ethanolamine, 2-amino-1-propanol, 3-amino-1-propanol, 2-amino-1-butanol, 4-amino-1-butanol, neopentanolamine, 5-aminopentanol, 4-methyl-4-amino-2-pentanol or even longer-chained alkanolamines. It is also possible to use alkanolamines which additionally contain one or more ether groups, for example 2-aminoethoxyethanol, or higher analogues. Preference is given to ethanolamine and 2-aminoethoxyethanol.

The ketimines of the above alkanolamines are easily obtainable from ketones and primary alkanolamines by removal of the water of reaction, for example by azeotropic distillation.

Examples of suitable ketones are: acetone, methyl ethyl ketone, methyl propyl ketone, methyl isopropyl ketone, methyl isobutyl ketone, methyl isoamyl ketone, diethyl ketone, dipropyl ketone and cyclohexanone. Preferred ketones are acetone, methyl ethyl ketone and cyclohexanone, in particular methyl isobutyl ketone.

Suitable isocyanate components comprise not only monocyanates but also diisocyantes of any desired structure. Preference is given to aliphatic diisocyanates, for example isophorone diisocyanate and hexamethylene diisocyanate.

Suitable for the further elasticization of these amino-containing urethanes are aliphatic and aromatic diols with or without ether groups, long-chain monoalcohols, and also polyesterols and polyetherols which are reacted with the isocyanate component together with the ketiminized aminoalcohol. Particular preference is given to monools and diols of from 4 to 20 carbon atoms and to polycaprolactone diols having molecular weights of from 500 to 2,000.

The reaction proceeds under conditions so mild as to virtually rule out any addition of the ketimine groups onto the isocyanate groups and as to permit OH addition almost exclusively. The equivalent ratios can be set in such a way that the alcoholic components are used not only in a stoichiometric amount but also in excess, based on the number of isocyanate groups, the equivalent ratio of isocyanate:elasticizing monoalcohol or dialcohol and ketiminized alkanolamine being preferably 1:0.1–1.9:0.9–0.1. This method gives oligourethanes having at least one urethane group in the chain and up to 2 ketimine groups at the end of the chain. The amine numbers are within the range from 30 to 200 mg of KOH/g, preferably 50 to 100 mg of KOH/g.

The optional diketimines of primary diamines (C) without urethane groups can be ketimines of any desired ketones with any desired primary diamines. Such ketimines are easily obtainable from ketones and primary diamines by removal of the water of reaction, for example by azeotropic distillation.

Suitable primary diamines are for example those which contain no further groups reactive with epoxy groups under mild conditions. For example, they must not contain any secondary amino groups or mercaptan groups, while alcoholic hydroxyl groups are too inert to interfere. Examples of suitable primary diamines are ethylenediamine, 1,3-diaminopropane, 1,4-diaminobutane, 1,6-diaminohexane, 4,9-dioxadodecane-1,12-diamine, 4,4'-diaminodicyclohexylmethane, 9-aminomethylstearylamine, 2-(3-aminopropyl)cyclohexylamine and also branched diamines, for example 2-methylpentanediamine and 2-ethylbutanediamine.

Besides such polyamines of low defined molecular weight it is also possible to use oligomeric or polymeric polyamines having average molecular weights $M_n$ of up to 3,000. Examples of such polyamines are diamines which are preparable by reductive cyanoethylation of polyols, such as polytetrahydrofuran. Such products contain terminal primary amino groups in the form of aminopropoxy groups.

Suitable ketones are in particular those which, aside from the keto group, contain no further group reactive toward a primary amino group. Examples of suitable ketones are acetone, methyl ethyl ketone, methyl propyl ketone, methyl isopropyl ketone, methyl isobutyl ketone, methyl isoamyl ketone, diethyl ketone, dipropyl ketone and cyclohexanone. Particularly preferred ketones are acetone, methyl ethyl ketone and methyl isobutyl ketone.

Optional secondary amines (D) can be any desired nonaromatic amines, for example dialkylamines such as dimethylamine, diethylamine, dipropylamine or dibutylamine. However, preference is given to alkanolamines, for example methylethanolamine, ethylethanolamine, diethanolamine, methylisopropanolamine, ethylisopropanolamine and diisopropanolamine. Suitable secondary amines (D) are also those which additionally have a tertiary amino group, for example N,N-diethyl-N'-isobutylpropylene-1,3-diamine and N,N-bis(2-hydroxyethyl)-N'-isobutylpropylene-1,3-diamine.

In some cases it can be advantageous to use as component (D) in addition ketimines of primary monoamines. It is in particular ketimines of long-chain primary monoamines, for example octylamine, laurylamine or stearylamine, or amide-amines of primary diamines and monocarboxylic acid, such as ethylhexanoic acid or higher fatty acids, which can be used for plasticizing the coatings prepared from the synthetic resin according to the invention.

Finally, it is also possible to use monoketimines of primary/tertiary diamines as component (D). Examples thereof are the ketimines of N,N-diethylethylenediamine and of N,N-diethylpropylene-1,3-diamine. These amines are more easily obtainable than the abovementioned secondary/tertiary diamines, and via their ketimines it is possible to incorporate additional basic groups in the resin.

The mixing ratios of components (A), (B) and if used (C) and (D) are variable within wide limits. For most of the purposes according to the invention it is desirable to prepare synthetic resins containing no epoxy groups. Therefore, in general, amounts used per epoxy equivalent of epoxy resin are from 1 to 2 equivalents of ketimines and secondary amines of components (B), (C) and (D). In the case of products which contain no component (D) and a difunctional component (B), the molecular weight of the synthetic resin according to the invention is regulated via the equivalent ratio between epoxy groups and ketimine groups. Per epoxy equivalent of epoxy resin (A) it is then preferable to use from 1.5 to 2 equivalents of ketimines of components (B) and (C). If component (D) is used in addition, the obtainable molecular weight is additionally limited by the amount of—monofunctional—component (D). As a result it is also possible to make the total amount of the equivalents of (B), (C) and (D) used equal to the equivalents of (A).

The average molecular weight $M_n$ of the synthetic resin according to the invention should be from about 1,000 to 10,000; for many purposes, for example for the preparation of cataphoretically depositable waterborne paint systems, average molecular weights $M_n$ of 1,500 to about 5,000 are desirable.

The reaction of components (A), (B) and if used (C) and (D) is advantageously carried out in the presence of solvents, for example hydrocarbons such as toluene or xylene, ketones, such as methyl ethyl ketones or methyl isobutyl ketone, alcohols such as ethanol or butanol, esters, ethers or the like, at from 50° to 150° C., preferably at from 80° to 130° C.

The synthetic resin according to the invention, following the treatment with water, contains hydroxyl groups, secondary amino groups and, in addition, a primary and/or tertiary amino groups. It is therefore capable of a large number of crosslinking reactions, which, following admixture of suitable crosslinking agents, makes it a useful binder for coatings.

Suitable crosslinking agents for the binder according to the invention are for example aminoplast resins, such as urea-formaldehyde resins, melamine resins or benzoguanamine resins, phenoplast resins, blocked isocyanate crosslinking agents, crosslinking agents which act via esteraminolysis and/or transesterification and have an average of at least two activated ester groups per molecule, for example $\beta$-hydroxyalkyl ester crosslinking agents as described in EP No. 0,040,867 and carboalkoxymethyl ester crosslinking agents as described in German Laid-Open Application DOS No. 3,233,139, urea condensation products, as obtained for example from primary diamines and/or polyamines, secondary monoamines and urea, in the presence or absence of a polyalcohol, for example trimethylolpropane, and $\beta$-hydroxyalkyl carbamate crosslinking agents as obtained for example by reacting polyprimary amines with ethylene carbonate. Particular preference is given to crosslinking agents which contain urethane groups, for example alcohol-capped isocyanates which are particularly readily dispersible in combination with the claimed binders and show very good stability not only in unpigmented but also in pigmented form.

The amount of crosslinking agent to be used depends on the nature and number of groups to be reacted with one another in the synthetic resin and the crosslinking agent and on the crosslinking density desired. In general, synthetic resin:crosslinking agent ratios of from 1:9 to 9:1, preferably from 1:1 to 9:1, in particular from 1.5:1 to 4:1, each based on the weight, are used.

It is not absolutely necessary to add separate crosslinking agents since crosslinking agent functions can also be incorporated in the synthetic resin according to the invention, so that it becomes self-crosslinking. This can be effected for example after the reaction of (A), (B) and if used (C) and (D) by reacting the resulting resin with a partially blocked polyisocyanate which on average still contains about one free isocyanate group in the molecule. The capping agents used on the polyisocyanate can be for example alcohols, phenols and oximes. A further way of rendering the synthetic resin according to the invention self-crosslinking consists in introducing $\beta$-hydroxyalkyl carbamate groups. To this end the ketone is first eliminated by hydrolysis from the resin according to the invention. The resulting primary amino groups are then for example converted with ethylene carbonate into $\beta$-hydroxyethyl carbamates.

Aside from crosslinking agents it is also possible to add further substances such as pigments, assistants, solvents and curing catalysts. The coating agents thus prepared can be applied in a conventional manner, such as spraying, dipping, casting or knife coating, to substrates such as wood, plastic or metal. The coatings are cured, depending on the crosslinking agent at from 120° to 210° C. in the course of from about 5 to 40 minutes, the lowest baking temperature requiring the longest baking time.

The amine numbers of the synthetic resins according to the invention are within the range from about 50 to 300 mg of KOH/g. They are therefore convertible, even if in admixture with the abovementioned crosslinking agents, by complete or partial protonation of the amino groups into aqueous dispersions which are advantageously suitable for the electrocoating of electroconductive substrates, for example metal parts. To this end a neutralizing agent, for example formic acid, acetic acid, lactic acid or phosphoric acid, is stirred in, followed by dilution with water to the processing concentration.

For cathodic electrocoating the solids content of an electrocoating bath is generally set to from 5. to 30% by weight. Deposition customarily takes place at from 15° to 40° C. for from 0.5 to 5 minutes at a pH of from 4.0 to 8.5, preferably pH 5.0–7.5, in general at deposition voltages of from 50 to 500 volts, with the electroconductive article to be coated connected as the cathode. The deposited film is cured at about 120° C. in the course of about 20 minutes.

I. PREPARATION OF KETIMINES OF PRIMARY AMINES

Component 1

In a reaction vessel, 232 g of hexamethylenediamine, 290 g of dimerized fatty acid and 40 g of xylene were heated to 190° C. and maintained at that temperature for one hour during which 29 g of an aqueous phase were separated off. Amine determination showed that the phase consisted of 18 g of water and 11 g of hexamethylenediamine. 11 g of hexamethylenediamine and 621 g of methyl isobutyl ketone were added to the batch, and 54 g of water were distilled off under reflux. The product had an amine number of 155 mg of KOH/g and contained 30% by weight of solvent.

Component 2

387 g of hexamethylenediamine, 580 g of dimeric fatty acid and 97 g of linseed oil acid were heated at 190° C. for 2 hours during which 48 g of an aqueous phase were separated off with 80 g of xylene.

696 g of the condensate left behind were admixed with 552 g of methyl isobutyl ketone, and 44 g of water were distilled off. The product had an amine number of 122 mg of KOH/g and a solvent content of 30% by weight.

Component 3

In a reaction vessel, 630.5 g of aminoethoxyethanol and 974 g of methyl isobutyl ketone were refluxed with the distillative removal of water until 105 g of water had been separated off. The product had an amine number of 232 mg of KOH/g.

In a reaction vessel, 450.6 g of 3-amino-1-propanol and 914.2 g of methyl isobutyl ketone were refluxed with the distillative removal of water until 107 g of water had been separated off. The product had an amine number of 266 mg of KOH/g.

Component 5

In a reaction vessel, 348 g of hexamethylenediamine and 880 g of methyl isobutyl ketone were refluxed with the distillative removal of water until 105 g of water had been separated off. The product had an amine number of 316 mg of KOH/g.

II. PREPARATION OF KETIMINIZED AMINES CONTAINING URETHANE GROUPS

Component A1

100.7 g of dipropylene glycol were initially introduced together with 362.1 g of component 3 and 0.72 g of dibutyltin dilaurate. 252.3 g of hexamethylene diisocyanate were added in such a way as not to exceed an internal temperature of 50° C. Following a delay phase at 50° C. of 1 hour, virtually no isocyanate was any longer detectable. The product had an amine number of 102 mg of KOH/g.

Component A2

412.5 g of polycaprolactonediol of molecular weight 550 (Capa 200, from Interox Chem.) were initially introduced together with 362.1 g of component 3 and 0.95 g of dibutyltin dilaurate. 252.3 g of hexamethylene diisocyanate were added in such a way as not to exceed an internal temperature of 50° C. Following a delay phase at 50° C. of 2 hours, virtually no isocyanate was any longer detectable. The product had an amine number of 72 mg of KOH/g.

Component A3

1,004.6 g of polycaprolactonediol of molecular weight 1,000 (Capa 210, from Interox Chem.) were initially introduced together with 482.8 g of component 3 and 3.66 g of dibutyltin dilaurate. 336.4 g of hexamethylene diisocyanate were added in such a way as not to exceed an internal temperature of 50° C. Following a delay phase at 50° C. for 2 hours, virtually no isocyanate was any longer detectable. The product had an amine number of 56 mg of KOH/g.

Component A4

502.3 g of polycaprolactonediol of molecular weight 1,000 (Capa 210, from Interox Chem.) were initially introduced together with 211 g of component 4 and 18.8 g of dibutyltin dilaurate. 168.2 g of hexamethylene diisocyanate were added in such a way as not to exceed an internal temperature of 50° C. Following a delay phase at 50° C. for 2 hours, virtually no isocyanate was any longer detectable. The product had an amine number of 55 mg of KOH/g.

Component A5

222.2 g of isophorone diisocyanate were dissolved together with 2.1 g of dibutyltin dilaurate in 55.6 g of toluene. 502.3 g of polycaprolactonediol of molecular weight 1,000 (Capa 210, from Interox Chem.) were added at 50° C. This is followed by a delay phase of 1 hour at 80° C. 241.4 g of component 3 were then added without the internal temperature exceeding 50° C. Following a delay phase of 2 hours at 50° C., virtually no isocyanate was any longer detectable. The product was subsequently diluted with 114 g of toluene and had an amine number of 44.6 mg of KOH/g.

Component A6

252.3 g of hexamethylene diisocyanate were dissolved in 63.1 g of toluene together with 2.4 g of dibutyltin dilaurate. A mixture of 301.4 g of polycaprolactonediol of molecular weight 1,000 (Capa 210, from Interox Chem.) and 579.4 g of component 3 was added at 50° C. Following a delay phase of 2 hours at 50° C., virtually no isocyanate was any longer detectable. The product had an amine number of 91 mg of KOH/g.

Component A7

168.2 g of hexamethylene diisocyanate were dissolved in 42.1 g of toluene together with 2.9 g of dibutyltin dilaurate. A mixture of 1,004.6 g of polycaprolactonediol of molecular weight 1,000 (Capa 210, from Interox Chem.) and 241.4 g of component 3 was added at 50° C. Following a delay phase of 2 hours, virtually no isocyanate was detectable. The product had an amine number of 33 mg of KOH/g.

III. PREPARATION OF THE NOVEL SYNTHETIC RESIN WITH BASIC NITROGEN GROUPS

Component B1

207.9 g of a diglycidyl ether of bis(4-hydroxyphenyl)-2,2-propane and epichlorohydrin having an equivalent weight of 485 and 54.3 g of an analogous diglycidyl ether having an equivalent weight of 190 were heated to the reflux point together with 60 g of toluene to remove traces of water present. 210.9 g of component 1 and 22.5 g of diethanolamine were then added and the mixture was heated to 120° C. 5 hours later epoxy was no longer detectable. The mixture was diluted with 11.8 g of butyl glycol and 50 g of isobutanol. The product had a solids content of 65% by weight.

Component B2

214.3 g of a diglycidyl ether of bis(4-hydroxyphenyl)-2,2-propane and epichlorohydrin having an equivalent weight of 189, 48 g of bis(4-hydroxyphenyl)-2,2-propane, 210.9 g of component 2, 3.22 g of methylethanolamine and 18 g of diethanolamine were mixed and maintained at 85° C. for 90 minutes and then at 100° C. for a further 90 minutes. The mixture was then diluted with 14.3 g of butylglycol and 107 g of isobutanol to a solids content of 65% by weight.

Component B3

314.9 g of a diglycidyl ether of bis(4-hydroxyphenyl)-2,2-propane and epichlorohydrin having an equivalent weight of 485 and 134.8 g of bis(4-hydroxyphenyl)-2,2-propane were heated to the reflux point together with 91.5 g of toluene to remove traces of water present. 96.3 g of component A1, 46.6 g of component 5 and 34.5 g of diethanolamine were then added. After the mixture had been stirred at 120° C. for 4 hours, epoxy was no longer detectable. The mixture was diluted with 161 g of isobutyl and 18 g of butylglycol to a solids content of 65% by weight. The product had an amine number of 70 mg of KOH/g (solid) and a plate cone viscosity of 1,140 mPas, measured at 75° C.

Component B4

485 g of a diglycidyl ether of bis(4-hydroxyphenyl)-2,2-propane and epichlorohydrin having an equivalent weight of 485 were heated to the reflux point in 121.3 g of toluene to remove any traces of water present. 243.5 g of component A2, 77.7 g of component 5 and 25 g of ethylethanolamine were then added. After the mixture had been stirred at 120° C. for 4 hours, epoxy was no longer detectable. The mixture was diluted with 123 g of isobutanol and 13 g of butylglycol to a solids content of 65% by weight. The product had an amine number of 76 mg of KOH/g (solid) and a plate cone viscosity of 700 mPas, measured at 75° C.

Component B5

485 g of a diglycidyl ether of bis(4-hydroxyphenyl)-2,2-propane and epichlorohydrin having an equivalent weight of 485 were heated to the reflux point in 121.3 g of toluene to remove any traces of water present. 313 g of component A3, 77.7 g of component 5 and 29.5 g of ethylethanolamine were then added. After the mixture had been stirred at 120° C. for 4 hours, epoxy was no longer detectable. The mixture was diluted with 216 g of isobutanol and 24 g of butylglycol to a solids content of 65% by weight. The product had an amine number of 70 mg of KOH/g (solid) and a plate cone viscosity of 1,180 mPas, measured at 75° C.

Component B6

485 g of a diglycidyl ether of bis(4-hydroxyphenyl)-2,2-propane and epichlorohydrin having an equivalent weight of 485 were heated to the reflux point in 121.3 g of toluene to remove any traces of water present. 318 g of component A4, 77.7 g of component 5 and 29.5 g of diethanolamine were then added. After the mixture had been stirred at 120° C. for 4 hours, epoxy was no longer detectable. The mixture was diluted with 215 g of isobutanol and 24 g of butylglycol to a solids content of 66% by weight. The product had an amine number of 68 mg of KOH/g (solid) and a plate cone viscosity of 1,250 mPas.

Component B7

485 g of a diglycidyl ether of bis(4-hydroxyphenyl)-2,2-propane and epichlorohydrin having an equivalent weight of 485 were heated to the reflux point in 121.3 g of toluene to remove any traces of water present. 393 g of component A5, 77.7 g of component 5 and 29.5 g of diethanolamine were then added. After the mixture had been stirred at 120° C. for 4 hours, epoxy was no longer detectable. The mixture was diluted with 177 g of isobutanol and 20 g of butylglycol to a solids content of 65% by weight. The product had an amine number of 62 mg of KOH/g (solid) and a plate cone viscosity of 960 mPas.

Component B8

485 g of a diglycidyl ether of bis(4-hydroxyphenyl)-2,2-propane and epichlorohydrin having an equivalent weight of 488 were heated to the reflux point in 121.3 g of toluene to remove any traces of water present. 462.1 g of component A6, 77.7 g of component 5 and 29.53 g of diethanolamine were then added. After the mixture had been stirred at 120° C. for 4 hours, epoxy was no longer detectable. The mixture was diluted with 200 g of isobutanol and 23 g of butylglycol to a solids content of 65% by weight. The product had an amine number of 69 mg of KOH/g (solid) and a plate cone viscosity of 1,440 mPas.

Component B9

970 g of a diglycidyl ether of bis(4-hydroxyphenyl)-2,2-propane and epichlorohydrin having an equivalent weight of 485 were heated to the reflux point in 242.5 g of toluene to remove any traces of water present. 1,063 g of component A7, 155.3 g of component 5 and 59.1 g of diethanolamine were then added. After the mixture had been stirred at 120° C. for 4 hours, epoxy was no longer detectable. The mixture was diluted with 540 g of isobutanol and 60 g of butylglycol to a solids content of 65% by weight. The product had an amine number of 58 mg of KOH/g (solid) and a plate cone viscosity of 640 mPas.

IV. PREPARATION OF CROSSLINKING COMPONENTS

Component C1

The method of Example 1 of German Laid-Open Application DOS No. 2,701,002 was followed to prepare a blocked isocyanate crosslinking agent (polyurethane crosslinking agent) by slowly adding 218 g of 2-ethylhexanol to 291 g of an 80/20 isomer mixture of 2,4-/2,6-toluylene diisocyanate with stirring under nitrogen while applying external cooling to keep the reaction temperature below 38° C. The batch was subsequently maintained at 38° C. for a further half hour and then heated to 60° C., whereupon 75 g of trimethylpropane were added, followed by 0.08 g of dibutyltin dilaurate as a catalyst. Following an exothermic reaction at the beginning the batch was maintained at 121° C. for 1.5 hours until essentially all the isocyanate groups had been consumed. The batch was then diluted with 249 g ethylene glycol monoethyl ether.

Component C2

1,340 g of trimethylolpropane, 3,600 g of urea, 3,870 g of dibutylamine, 1,740 g of hexamethylenediamine and 3,570 g of 3,3'-dimethyl-4,4'-diaminodicyclohexylmethane were slowly heated up. 120° C. saw the elimination of ammonia, and the urea dissolved. The temperature was raised to 155° C. in the course of 2 hours of vigorous refluxing during which large amounts of a soft, crystalline precipitate were produced. Following a further 5 hours under reflux the precipitate had redissolved and the temperature had risen to 165° C. 3,870 g of dibutylamine were then added dropwise in the course of 2 hours, and afterwards heating was continued at 185° C. for 8 hours. 3,600 g of dibutylamine were then distilled off at that temperature under reduced pressure, and after the residue had cooled down to 130° C. it was diluted with 5,170 g of toluene. The product was a colorless viscous liquid having a solids content of 70% by weight.

Component C3

The method of Example 2(d) of EP No. 0,040,867 was followed to prepare a polyester crosslinking agent: 192 g of trimelittic anhydride and 500 g of glycidyl versatate having an epoxy equivalent weight of 250 were mixed, and the mixture was heated with stirring to 100° C. An exothermic reaction appeared, and the temperature rose to 190° C. After cooling down to 140° C., 2 parts of benzyldimethylamine were added. The mixture was maintained at 140° C. for 3 hours. The result was a viscous, clear product which was diluted with toluene to a solids content of 70% by weight.

V. PREPARATION OF DISPERSIONS

Components (B) and (C) were mixed in the ratios stated below, and glacial acetic acid was added. A dispersion was then prepared with stirring by the slow addition of water.

| Dispersion of Example | Component B | Component C | Glacial acetic acid | Water | LT[1] (%) |
|---|---|---|---|---|---|
| 1[2] | 915 g (B1) | 322 g (C1) | 20.0 g | 4109 g | 70 |
| 2[2] | 915 g (B2) | 322 g (C2) | 20.0 g | 4109 g | 75 |
| 3 | 915 g (B3) | 322 g (C1) | 15.6 g | 4114 g | 89 |
| 4 | 915 g (B4) | 322 g (C1) | 15.6 g | 4114 g | 92 |
| 5 | 915 g (B5) | 322 g (C1) | 15.6 g | 4114 g | 94 |
| 6 | 915 g (B5) | 322 g (C2) | 15.6 g | 4114 g | 85 |
| 7[3] | 915 g (B5) | 322 g (C3) | 15.6 g | 4114 g | 88 |
| 8 | 915 g (B6) | 322 g (C1) | 15.6 g | 4114 g | 83 |
| 9 | 915 g (B7) | 322 g (C1) | 15.6 g | 4114 g | 90 |
| 10 | 915 g (B8) | 322 g (C1) | 15.6 g | 4114 g | 93 |
| 11 | 915 g (B9) | 322 g (C1) | 15.6 g | 4114 g | 88 |

(1) Light transmittance: the higher the value, the finer and more stable the dispersion.

(2) Reference tests: despite addition of more acetic acid only comparatively coarse dispersions were preparable.

(3) The addition of water was preceded by the addition of 16.1 g of lead octoate (24% of Pb).

VI. PREPARATION OF PIGMENTED ELECTROCOATING BATHS PIGMENT PASTE:

525.8 g of component A2 were admixed with 168.7 g of butylglycol, 600 g of water and 16.5 g of acetic acid. 800 g of titanium dioxide, 11.0 g of carbon black and 50 g of basic lead silicate were then added. The mixture was ball milled to a particle size of less than 9 μm. Water was then added to adjust the solids content to 49% by weight. Electrocoating baths:

The particular dispersion was admixed with 968 g of the pigment paste. The baths were stirred at 28° C. for 120 hours. Zinc-phosphatized steel test panels in cathode connection were coated with paint films deposited at the stated voltage in the course of 120 seconds and were baked at 170° C. for 20 minutes. The following table shows the results:

| Results of paint test: layer thickness 20 μm | | | | |
|---|---|---|---|---|
| Dispersion | pH | Voltage (V) | Indentation (Nm)[1] | Salt spray test acc. to DIN 53,167 underpenetration at scribe (mm) |
| 1 | 7.1 | 320 | 18.08 | 1.0 |
| 2 | 7.3 | 300 | 18.08 | 1.0 |
| 3 | 7.1 | 320 | 18.08 | 0.7 |
| 4 | 7.3 | 320 | 18.08 | 0.5 |
| 5 | 7.2 | 340 | 18.08 | 0.6 |
| 6 | 7.1 | 320 | 18.08 | 0.6 |
| 7 | 7.2 | 330 | 18.08 | 0.5 |
| 8 | 7.0 | 330 | 18.08 | 0.5 |
| 9 | 7.0 | 310 | 18.08 | 0.4 |
| 10 | 6.9 | 330 | 18.08 | 0.5 |
| 11 | 6.8 | 300 | 18.08 | 0.6 |

[1]The indentation was determined with a mandrel impact tester from Gardner in accordance with ASTM D 2794.

We claim:

1. A synthetic resin which carries basic nitrogen groups and is water-dilutable by protonation with an acid, comprising a reaction product of
   (A) an epoxy resin having an average molecular weight $M_n$ of from 300 to 6,000 and an average of from 1.5 to 3.0 epoxy groups per molecule, and
   (B) a ketimine of a primary amine additionally containing one or more urethane groups, which reactionproduct,
following hydrolysis contains hydroxy groups, secondary amino groups and primary and/or tertiary amino groups which have been reacted so as to make the resulting resin self-crosslinking.

2. The synthetic resin of claim 1 comprising a reaction product of (A) and (B), and
   (C) a diketimine of a diprimary amine containing no urethane groups,
which reaction product, following hydrolysis contains hydroxy groups, secondary amino groups and primary and/or tertiary amino groups which have been reacted so as to make the resulting resin self-crosslinking.

3. The synthetic resin of claim 1, comprising a reaction product of (A) and (B) and
   (D) a secondary amine which may contain a tertiary amino group, a ketimine of a primary monoamine, a ketimine of a primary/tertiary diamine or a mixture thereof,
which reaction product, following hydrolysis contains hydroxy groups, secondary amino groups and primary and/or tertiary amino groups which have been reacted so as to make the resulting resin self-crosslinking.

4. The synthetic resin of claim 2 comprising a reaction product of (A), (B), (C) and
   (D) a secondary amine which may contain a tertiary amino group, a ketimine of a primary monoamine, or a ketimine of a primary/tertiary diamine or a mixture thereof, which reaction product, following hydrolysis contains hydroxy groups, secondary amino groups and primary and/or tertiary amino groups which have been reacted so as to make the resulting resin self-crosslinking.

5. The synthetic resin of claim 1, wherein the hydroxy groups have been at least partly converted into urethane groups by reaction with partially blocked polyisocyanate.

6. The synthetic resin of claim 2, wherein the hydroxy groups have been at least partly converted into urethane groups by reaction with partially blocked polyisocyanate.

7. The synthetic resin of claim 3, wherein the hydroxy groups have been at least partly converted into urethane groups by reaction with partially blocked polyisocyanate.

8. The synthetic resin of claim 4, wherein the hydroxy groups have been at least partly converted into urethane groups by reaction with partially blocked polyisocyanate.

9. An aqueous dispersion comprising a synthetic resin which carries basic nitrogen groups, is water-dilutable by protonation with an acid, and comprises the reaction product of:
   (A) an epoxy resin having an average molecular weight $M_n$ of from 300 to 6,000 and an average of from 1.5 to 3.0 epoxy groups per molecule; and
   (B) a ketimine of a primary amine additionally containing one or more urethane groups
and a crosslinking agent, said aqueous dispersion being obtained by protonating said synthetic resin with an acid.

10. The aqueous dispersion of claim 9, wherein said synthetic resin comprises the reaction product of (A), (B) and
   (C) a diketimine of a diprimary amine containing no urethane groups.

11. The aqueous dispersion of claim 9, wherein said synthetic resin comprises the reaction product of (A), (B) and
   (D) a secondary amine which may contain a tertiary amino group, a ketimine of a primary monoamine, or a ketimine of a primary/tertiary diamine or a mixture thereof.

12. The aqueous dispersion of claim 10, wherein said synthetic resin comprises the reaction product of (A), (B), (C) and
   (D) a secondary amine which may contain a tertiary amino group, a ketimine of a primary monoamine, or a ketimine of a primary/tertiary diamine or a mixture thereof.

13. An aqueous dispersion comprising the synthetic resin of claim 1, said aqueous dispersion being obtained by protonating said synthetic resin with an acid.

14. An aqueous dispersion comprising the synthetic resin of claim 2, said aqueous dispersion being obtained by protonating said synthetic resin with an acid.

15. An aqueous dispersion comprising the synthetic resin of claim 3, said aqueous dispersion being obtained by protonating said synthetic resin with an acid.

16. An aqueous dispersion comprising the synthetic resin of claim 4, said aqueous dispersion being obtained by protonating said synthetic resin with an acid.

17. A coating agent comprising a binder and a crosslinking agent, said binder being a synthetic resin which carries basic nitrogen groups, is water-dilutable by protonation with an acid, and comprises the reaction product of (A) an epoxy resin having an average molecular weight $M_n$ of from 300 to 6,000 and an average of from 1.5 to 3.0 epoxy groups per molecule; and (B) a ketimine of a primary amine additionally containing one or more urethane groups.

18. The coating agent of claim 17, wherein said synthetic resin comprises the reaction product of (A), (B) and (C) a diketimine of a diprimary amine containing no urethane groups.

19. The coating agent of claim 17, wherein said synthetic resin comprises the reaction product of (A), (B) and (D) a secondary amine which may contain a tertiary amino group, a ketimine of a primary monoamine, or a ketimine of a primary/tertiary diamine or a mixture thereof.

20. The coating agent of claim 18, wherein said synthetic resin comprises the reaction product of (A), (B), (C) and (D) a secondary amine which may contain a tertiary amino group, a ketimine of a primary monoamine, or a ketimine of a primary/tertiary diamine or a mixture thereof.

* * * * *